United States Patent [19]  
Chou

[11] Patent Number: 4,640,763  
[45] Date of Patent: Feb. 3, 1987

[54] INJECTION OF LPG INTO TCC UNIT  
[75] Inventor: Tai-Sheng Chou, Sewell, N.J.  
[73] Assignee: Mobil Oil Corporation, New York, N.Y.  
[21] Appl. No.: 787,196  
[22] Filed: Oct. 15, 1985  
[51] Int. Cl.$^4$ .......... C10G 57/02; C07C 2/12; C07C 2/58  
[52] U.S. Cl. ............ 208/78; 208/113; 208/120; 585/417; 585/523; 585/533; 585/722  
[58] Field of Search .......... 208/113, 120, 78, 79, 208/174, 176, 70, 71, 74; 585/415, 417, 523, 533, 722

[56] References Cited  
U.S. PATENT DOCUMENTS  
2,280,258 4/1942 Pier .................................. 208/108  
2,868,721 1/1959 Bergstrom ........................ 208/174  
3,002,805 10/1961 Browning, Jr. et al. ........... 208/174  
3,679,563 7/1972 Pollock ............................. 208/166  
3,760,024 9/1973 Cattanach ......................... 585/415  
4,150,062 4/1979 Garwood et al. ................. 585/415  
4,180,689 12/1979 Davies et al. .................... 585/407  
4,345,992 8/1982 Washer et al. ................... 208/120  
4,473,658 9/1984 Schwartz .......................... 502/45

Primary Examiner—Brian E. Hearn  
Assistant Examiner—O. Chaudhuri  
Attorney, Agent, or Firm—A. J. McKillop; M. G. Gilman; M. V. Schneller

[57] ABSTRACT

The invention is directed to improve the profitability of existing catalytic cracking operations. Specifically, in thermofor catalytic cracking, liquified petroleum gases (LPG) are injected to the internal seal leg of the reactor for converting LPG to more valuable products and to prevent products and feed from surging out of the reaactor vessel.

20 Claims, 2 Drawing Figures

INJECTION OF LPG INTO TCC UNIT

FIELD OF THE INVENTION

The invention is directed to a process for improving the overall efficiency of catalytic cracking. The process involves adding LPG, undesirable cracking by-products, to cracking units to convert the LPG to olefinic gases or higher molecular weight components. The nature of those higher molecular weight components can depend on the catalyst system used in the cracking unit.

BACKGROUND OF THE INVENTION

Petroleum gases, ethane, propane, butane and isobutane and their unsaturated analogs, ethylene, propylene, butene and isobutene, are produced during cracking of petroleum feeds. Those petroleum gases, sometimes referred as LPG, may be sold, as is. Alternatively, portion of the gases, e.g., propylene, butenes and isobutane can be converted into alkylate, which have a desirable antiknock rating. Moreover, the petroleum gas can be subjected to oligomerization to produce $C_5$–$C_{10}$ paraffins and to dehydrocyclization to produce aromatics. High yields of LPG during catalytic cracking contribute to low product value for an operating refinery. Both the charge stock and severity of operating conditions can influence LPG production. Although refineries can utilize at least a portion of the butane for gasoline blends, the propane and any remainder butane, if sold, will be sold at a large discount (currently about $20/bbl) compared to gasoline or alkylates (currently about $35/bbl). It is, therefore, highly desirable to upgrade the normal saturated LPG produced during cracking.

SUMMARY OF THE INVENTION

The invention is directed to improvements in the thermofor catalytic cracking (TCC) process. Additional feed comprising normal, saturated LPG, is introduced into the internal seal leg of the reactor to convert at least a portion of the LPG to olefins or higher ($C_5$+) molecular weight products and to seal the reactor unit.

DETAILED DESCRIPTION

Figure 1:
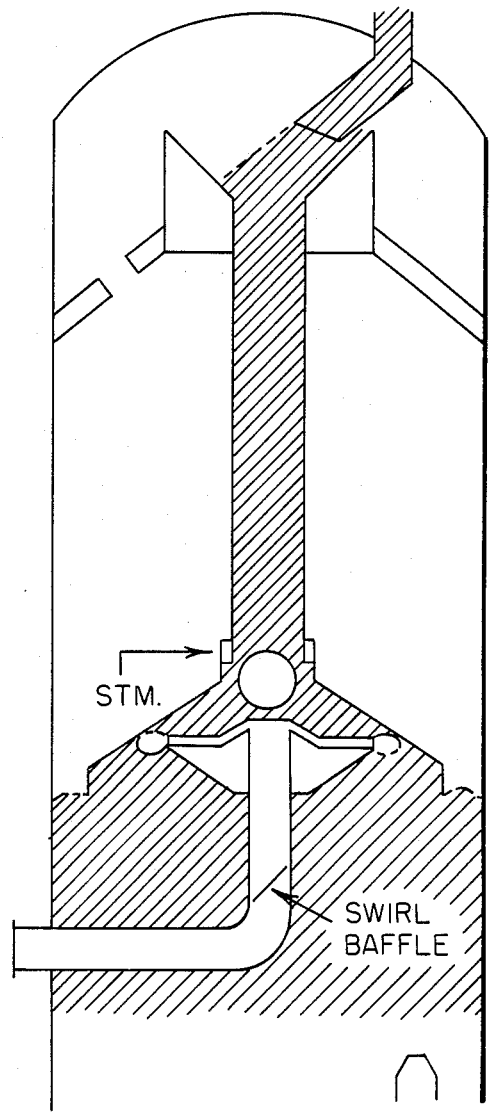
FIG. 1 depicts a conventional TCC reactor unit. Steam injection at 2, the internal seal leg of the TCC unit, prevents hydrocarbons from surging upwards into the upper reactor chamber.

Steam has been conveniently used in the internal seal leg of the TCC (FIG. 1) for preventing hydrocarbons from surging upward into the upper reactor chamber in which thermal cracking may contribute to the undesirable conditions, e.g., coking by the heavy components. The boiling range of the cracking unit feed ranges from about 500° to about 1100° F. The cracked product may include fuel gas, LPG; gasoline having a boiling range of about 70° to about 400° F.; light fuel oil having a boiling range of from about 400° to about 650° F.; heavy fuel oil having a boiling range of about 600° to 850° F.; and bottoms having boiling ranges greater than 850° F.

However, the use of steam in the high temperature catalyst seal leg section (about 1100° F.) contributes to the hydrothermal deactivation of the zeolitic catalyst. Consequently, it is highly desirable to replace this seal steam with low moisture content gases.

In accordance with the invention, LPG is injected into the internal seal leg of the TCC reactor to decrease the partial pressure of steam therein. The partial pressure of LPG in steam therein can range from 1 to 20 psi, and preferably is 10 psi. The pressure in the internal seal leg can range from 10 to 20 psig while the temperature therein can range from 1000° to 1150° F. Operating conditions within the reactor unit include temperatures ranging from 850° to 980° F., pressures of from 8 to 18 psig.

The catalyst composition used in the seal leg comprises at least an amount of a catalyst effective to convert any one of the LPG components to higher molecular weight, $C_5$+ components. The catalysts effective to undertake such a conversion can do so by way of dehydrogenation, alkylation, oligomerization and/or aromatization. Alkylation reactions include the addition of olefins and alkanes in the presence of the acid catalysts, e.g. the addition of isobutylene and isobutane to form 2,2,4-trimethyl pentane. Alkylation may also involve the addition of olefins to aromatic hydrocarbons; typical of aromatic alkylation is the combination of ethylene and benzene to form ethyl benzene. Alkylation can generally be defined as the union of an unsaturated and a saturated compound to form a saturated, branched chemical compound. Conditions for alkylation include a temperature of between about 100° F. and about 950° F., a pressure of between about atmospheric and 900 psig and a WHSV of between about 1 and 500.

Oligomerization and polymerization involve the linking of similar molecules in the presence of heat and catalyst to form bigger molecules. Oligomerization involves the forming of dimers, trimers and quatramers, whereas, typical polymerization concerns the joining of light olefins to form a very long chain olefin. Olefin oligomerization and polymerization conditions include a temperature of from about 950° to 1100° F., a pressure of from about atmospheric to about 10,000 psig, a WHSV (when a flow operation) from about $0.1^{-1}$ to about 50 $hr^{-1}$.

Aromatization may be undertaken at temperatures of from about 550° F. to about 1200° F., a pressure from about atmospheric to about 10,000 psig, a WHSV (when a flow operation) of from about 0.1 $hr^{-1}$ to about 10 $hr^{-1}$.

Acid catalyzed reactions, such as alkylation, addition, dimerization, oligomerization, (polygomerization) and aromatization may be conducted in the presence of a zeolite which is in the acid form, as described in U.S. Pat. No. 4,324,940. As synthesized, the zeolite may or may not be in the acid form. However, salt forms of the zeolite may be readily converted to the acid form of the zeolite, by ammonium ion exchange, followed by calcination; calcination causes the evolution of ammonia and conversion of the zeolite to its acid form. The type of zeolites which may effect the acid catalyzed reactions are shaped selective. These shape selective zeolite may be alternatively defined by a constraint index.

The "constraint index" is calculated as follows:

Constraint Index =

$$\frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. The ZSM-22 zeolite has a constraint index of about 7.3 at 800° F. (427° C.). Constraint Index (CI) values for some other typical zeolites are:

| Zeolite | C.I. |
| --- | --- |
| ZSM-5 | 8.3 |
| ZSM-11 | 8.7 |
| ZSM-12 | 2 |
| ZSM-23 | 9.1 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H—Zeolon | 0.4 |
| REY | 0.4 |
| Amorphous Silica-Alumina (non-zeolite) | 0.6 |
| Erionite | 38 |

It is to be realized that the above constraint index values typically characterize the specified zeolites but that these are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables, such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is an approximation, taking into consideration the manner of its determination, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1150° F. and a liquid hourly space velocity of less than one, such as 0.1 or less, can be employed in order to achieve a minimum total conversion of about 10%.

Furthermore, the reactions of dehydrogenation, alkylation, oligomerization and aromatization may be conducted in the presence of said shaped selective catalysts, which contain promoters. Promotors for those reactions are described in U.S. Pat. Nos. 4,417,088; 4,423,269; 4,180,689; 4,392,989; and 4,350,835. Specifically, U.S. Pat. No. 4,423,269 describes zinc as a promoter; U.S. Pat. Nos. 4,180,689 and 4,392,989 describe gallium and gallium plus zinc as promoters; while gallium is used as a promoter in U.S. Pat. No. 4,350,835. The preferred shape selective zeolite used in these patents is ZSM-5. In U.S. Pat. No. 4,238,318, iron is used as a promoter for the zeolite-like material.

The aforementioned catalyst components which are effective to catalyze dehydrogenation, alkylation, oligomerization and aromatization reactions, may replace in part or in whole, the catalyst which is used in the TCC unit.

The conventional cracking catalyst which can be used in the TCC reactor include relatively large pore zeolites in clay or other matrix material. The cracking catalyst may be zeolite X, zeolite Y, zeolite Y in its rare earth exchanged form. (vis REY) or ultra stable Y. Suitable cracking catalysts contain 1 to 30 wt % of the large pore zeolite in the matrix. The cracking catalyst may be in any size and shape which is suitable for moving bed catalytic cracking and may be in the form of oil drop, dropped spheres, balls, pills, extradates and beads. The cracking catalyst may be modified to include ZSM-5, as described in U.S. Pat. No. 3,706,886. In U.S. Pat. No. 3,758,403, the entire content of which is incorporated herein by reference, at least 2½% ZSM-5 is added to a conventional cracking catalyst.

Figure 2:
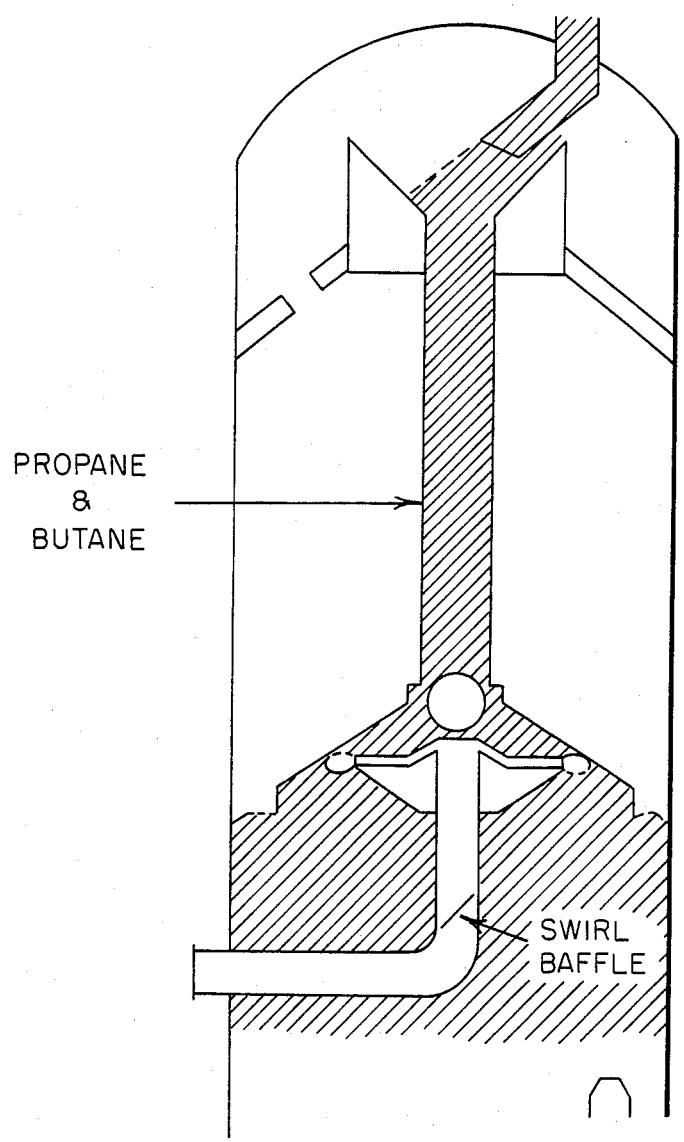
FIG. 2, depicts a TCC reactor unit, modified in accordance with the invention. LPG injection at inlet 4 replaces at least in part steam injected as in FIG. 1.

The average residence time for the LPG in the internal seal leg and the feed inlet cone region is about two to five seconds, depending on the LPG charge rate, determined by calculation. Various means can be used to increase or decrease the LPG catalyst contact time, for maximizing conversion. For example, the injection port, element four (4) of FIG. 2, can be positioned to maximize LPG conversion. Alternatively, the diameter of the internal seal leg, or of the injection port, may be altered. Catalyst modification for LPG dehydrogenation and dehydrocyclization, can enhance LPG conversion under seal leg conditions. The TCC seal leg conditions are feasible for propane dehydrogenation. Equilibrium conversion at 1100° F. is about 34 percent; concurrently, experimental results indicated minimum heavy product, ($C_{10}+$ material). Consequently, the use of propane in the internal seal leg of the TCC will produce minimal coke in the seal leg. Moreover, reducing the amount of steam in the internal seal leg of the TCC will reduce hydrothermal deactivation of zeolitic catalyst used in the cracking operation.

Since the future trend appears to reside in increasing the operating severity of the TCC unit, for reducing heavy fuel oil production, there will be an incremental increase in LPG production. Product value increase due to LPG conversion, in accordance with the invention, coupled with catalyst saving, may significantly improve the profitability of the existing TCC units, used under increased operating severity conditions.

What is claimed is:

1. A process for catalytically cracking hydrocarbon feed in a bed of catalyst effective to crack said hydrocarbon feed, comprising contacting said feed under catalytic cracking conditions, with said catalyst in a first portion of said bed, to produce cracked product; sealing another portion of that bed of catalyst by introducing into said another portion of that bed a seal selected from the group consisting of ethane, propane, butane, isobutane, ethylene, propylene, butylene, isobutylene and mixtures thereof whereby feed and cracked product are prevented from surging into said another portion;

whereby contact of the seal with catalyst in said another portion of the bed results in conversion of the seal to the higher molecular weight adducts thereof, the condition in said another portion of the bed being effective to provide said conversion.

2. The process of claim 1, wherein said bed of catalyst is a moving bed.

3. The process of claim 1, wherein said first portion of the bed is contained in a reactor unit.

4. The process of claim 3, wherein said another portion of the bed is contained in a leg to first portion of the bed.

5. The process of claim 2, wherein said first portion of the bed is contained in a reactor unit.

6. The process of claim 5, wherein said another portion of the bed is contained in a leg to the first portion of the bed.

7. The process of claim 1, wherein the catalyst in said another portion of the bed includes a zeolite having a constraint index of about 1 to about 12.

8. The process of claim 4, wherein said catalyst in said another portion of the bed includes a zeolite having a constraint index of about 1 to about 12.

9. The process of claim 6, wherein said catalyst in said another portion of the bed includes a zeolite having a constraint index of about 1 to about 12.

10. The process of claim 7, wherein said zeolite is ZSM-5.

11. The process of claim 8, wherein said zeolite is ZSM-5.

12. The process of claim 9, wherein said zeolite is ZSM-5.

13. The process of claim 10, wherein said catalyst in said another portion further includes a promoter which promotes said adduct formation.

14. The process of claim 12, wherein said catalyst in said another portion further includes a promoter which promotes said adduct formation.

15. The process of claim 11 wherein said catalyst in said another portion of the bed further includes a promoter which promotes said adduct formation.

16. The process of claim 13 wherein said promoter comprises zinc, gallium or admixtures thereof.

17. The process of claim 14, wherein said promoter comprises zinc, gallium or admixtures thereof.

18. The process of claim 15, wherein said promoter comprises zinc, gallium or admixtures thereof.

19. The process of claim 1, wherein said introducing of the seal reduces the partial pressure of steam in said another portion of the bed.

20. The process of claim 19, wherein the catalyst comprises a zeolite, whereby hydrothermal deactivation of the catalyst is reduced.

* * * * *